US009003205B2

(12) United States Patent (10) Patent No.: US 9,003,205 B2
Iyer et al. (45) Date of Patent: Apr. 7, 2015

(54) METHOD TO LOWER THE OPERATING COST OF WIRELESS NETWORK BY ENFORCING LOW POWER INFRASTRUCTURE OPERATION

(75) Inventors: Rajiv Iyer, San Jose, CA (US); Jason Harris, Morgan Hill, CA (US); Ramesh Sekhar, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1036 days.

(21) Appl. No.: 12/415,539

(22) Filed: Mar. 31, 2009

(65) Prior Publication Data

US 2010/0250992 A1 Sep. 30, 2010

(51) Int. Cl.
*G06F 1/32* (2006.01)
*H04W 52/02* (2009.01)
*H04W 84/12* (2009.01)

(52) U.S. Cl.
CPC ............ *H04W 52/0274* (2013.01); *G06F 1/32* (2013.01); *H04W 84/12* (2013.01); *Y02B 60/50* (2013.01)

(58) Field of Classification Search
CPC ........... G06F 1/26; G06F 1/32; G06F 1/3203; G06F 1/3206; G06F 1/3209; G06F 1/3234; G06F 1/3246; G06F 1/3287; G06F 1/00; H04B 1/1615; H04B 7/0877; H04W 4/001; H04W 52/00; H04W 52/02; H04W 52/0203; H04W 84/12; H04W 52/0274; H04W 4/00; Y02B 60/50
USPC .................. 713/300, 310, 320–324, 330, 340
See application file for complete search history.

(56) References Cited

U.S. PATENT DOCUMENTS

| 5,511,069 | A  | * | 4/1996 | England et al. ............... 370/276 |
|---|---|---|---|---|
| 7,281,143 | B2 | * | 10/2007 | Parra et al. ..................... 713/320 |
| 7,657,234 | B2 | * | 2/2010 | Qu et al. .......................... 455/72 |
| 7,715,800 | B2 | * | 5/2010 | Sinha ......................... 455/67.11 |
| 7,969,918 | B2 | * | 6/2011 | Takatori et al. ............... 370/270 |
| 8,102,825 | B2 |   | 1/2012 | Kalhan |
| 2005/0154933 | A1 | * | 7/2005 | Hsu et al. ...................... 713/320 |
| 2008/0062942 | A1 | * | 3/2008 | Hills et al. .................... 370/338 |
| 2008/0181184 | A1 | * | 7/2008 | Kezys ........................... 370/338 |
| 2009/0034443 | A1 |   | 2/2009 | Walker et al. |
| 2009/0191876 | A1 | * | 7/2009 | Jain et al. ..................... 455/437 |
| 2009/0325495 | A1 | * | 12/2009 | LaBerge ...................... 455/63.1 |
| 2010/0002610 | A1 | * | 1/2010 | Bowser et al. ............... 370/311 |
| 2010/0002614 | A1 |   | 1/2010 | Subrahmanya |
| 2010/0003921 | A1 | * | 1/2010 | Godlewski et al. ........ 455/67.11 |

(Continued)

FOREIGN PATENT DOCUMENTS

WO 2009108589 A1 9/2009
WO 2010030952 A2 3/2010

OTHER PUBLICATIONS

Pullen, "A method for reducing the power consumption of a mobile device", WO 2007/141536, Dec. 13, 2007.*
International Search Report and Written Opinion for counterpart International Application No. PCT/US2011/054226 mailed on Dec. 8, 2011.
Jardosh, A., et al., "Green WLANs: On-Demand WLAN Infrastructures," Mobile Network Appl (2009), vol. 14, Dec. 9, 2008, pp. 798-814.

(Continued)

*Primary Examiner* — Fahmida Rahman

(57) ABSTRACT

A system and techniques for managing power utilization in a wireless local area network are disclosed. The system can utilize an infrastructure power management module that is configured to identify and power down one or more unused wireless devices and/or dynamically reconfigure the wireless operation of one or more wireless devices to consume lower power while still operating according to network requirements.

10 Claims, 3 Drawing Sheets

(56) References Cited

U.S. PATENT DOCUMENTS

| | | |
|---|---|---|
| 2010/0138549 A1 | 6/2010 | Goel et al. |
| 2010/0165959 A1 | 7/2010 | Park et al. |
| 2010/0195549 A1* | 8/2010 | Aragon et al. ............... 370/311 |
| 2010/0211806 A1* | 8/2010 | Diab et al. .................. 713/310 |
| 2012/0099495 A1 | 4/2012 | Mitra et al. |

OTHER PUBLICATIONS

Non-Final Office Action mailed May 29, 2013 in U.S. Appl. No, 12/912,361, Sanjib Mitra et al., filed Oct. 26, 2010.

Notice of Allowance mailed Sep. 3, 2013 in U.S. Appl. No. 12/912,361, Sanjib Mitra et al., filed Oct. 26, 2010.

Notice of Allowance mailed Dec. 23, 2013 in U.S. Appl. No. 12/912,361, Sanjib Mitra et al., filed Oct. 26, 2010.

* cited by examiner

METHOD TO LOWER THE OPERATING COST OF WIRELESS NETWORK BY ENFORCING LOW POWER INFRASTRUCTURE OPERATION

TECHNICAL FIELD

This disclosure relates to wireless network operation, and more particularly to low power infrastructure operation of wireless networks.

BACKGROUND

Over the past few years, IEEE 802.11 based wireless networking has seen rapid advances. Today, wireless networks are now able to meet or exceed mobility, security, quality of service and performance requirements in an enterprise. Many vendors are announcing products based on 802.11n technology that have achieved up to 300 Mbps network speed. The increased performance and security have been achieved by Wireless Local Area Networking (WLAN) vendors using purpose built hardware platforms that can use multiple cores for computation. This has unfortunately increased the power consumption and hence the cost of operating the wireless network.

In this context, enterprises have deployed wireless switches and/or access points to provide wireless access to its employees and customers. There are, however, a number of factors that can influence the number of wireless switches, access points and their deployed placement. For example, in some embodiments, the following factors are considered: number of wireless users, desired application throughput per user, coverage area for the wireless network, desired application throughput at a given distance from an access point, user density, seamless roaming for applications such as voice, greater access point density for improved location tracking accuracy, as well as type of wireless client.

Typically, a wireless network is over deployed for capacity and function in anticipation of future growth. For example, administrators may choose multi-radio access points even though a single radio access point may suffice for their current needs. Although wireless standards such as 802.11 have focused on reduced power consumption of wireless clients, the standards have left the larger power consumption issue of WLAN infrastructure relatively unaddressed. This over deployment has resulted in WLAN infrastructure consuming and radiating more power than is required for the present needs of the enterprise. This can lead to unnecessary RF transmissions that can impact the performance of the wireless network. For example, in some 802.11 based wireless networks where wireless clients and access points contend for access to the medium, large numbers of 802.11 transmitters can reduce the available transmission opportunities for remaining clients thus negatively impacting the performance of the wireless network.

Accordingly, there is a need for improved systems and techniques for the management and control of power consumption in WLAN infrastructures.

SUMMARY

A system and techniques for managing power utilization in a wireless local area network are disclosed. The system can utilize an infrastructure power management module that is configured to identify and power down one or more unused wireless devices and/or dynamically reconfigure the wireless operation of one or more wireless devices to consume lower power while still operating according to network requirements.

Various aspects of the invention relate to monitoring and reconfiguring network components. For example, according to one aspect, a method of managing power utilization in a wireless local area network (WLAN) infrastructure includes monitoring network operation information of a first network component included in the WLAN infrastructure, the network operation information including a power utilization of the first network component, comparing the power utilization of the first network component to a threshold utilization value defined for the first network component, and reconfiguring the first network component to operate at the threshold utilization value based on the comparison. The first network component can be a wireless switch or a wireless access port. The method also can include powering down the first network component based on the comparison.

In one embodiment, the method further includes defining a rule for the first network component, the rule including operational network control information for the first network component and the threshold utilization value, and applying the rule to the first network component during the reconfiguration. Applying the rule can include identifying the rule from a plurality of rules stored for a plurality of network components included in the WLAN infrastructure, each of the rules associated with at least one of the plurality of network components.

In another embodiment, reconfiguring the first network component includes minimizing power utilization of the first network component based on the comparison.

In one embodiment, the method includes monitoring network operation information of a second network component included in the WLAN infrastructure, the network operation information of the second network component including a second network component utilization, and powering on the first network component if the second network component utilization exceeds a second threshold value, wherein the second network component is at least one of a wireless switch and wireless access port.

The method can include powering on the first network component periodically to monitor the network operation information of the second network component. The first network component also can be powered off based on inactivity information included in network operation information.

In yet another embodiment, the method includes reconfiguring the first network component to operate at a full power utilization level. The power utilization obtained from the first network component can be averaged over a period of time. If the first network component is powered off, the method can include powering on the first network component in response to receiving location information indicating a mobile device approaching a coverage area defined for the first network component.

In yet another embodiment, at least one of the monitoring, the comparing, and the reconfiguring steps are integrated in and executed from a network management platform of the WLAN infrastructure. In an alternative embodiment, at least one the monitoring, the comparing, and the reconfiguring are integrated in and executed from the first network component.

In another aspect, a system for managing power consumption of a WLAN infrastructure includes a wireless network, a first network component operatively coupled to the network, the first network component being at least one of a wireless switch and a wireless access port, and an infrastructure power management module. The power management module is configured to 1) monitor network operation information of a first network component included in the WLAN infrastructure, the network operation information including a power utilization of the first network component at a first point in time, 2) compare the power utilization utilized by the first network component to a threshold utilization value defined for the first network component, and 3) reconfigure the first network component to operate at the threshold utilization value based on the comparison. the first network component can be a wireless switch or a wireless access port.

In one embodiment, the infrastructure power management module is configured to define a rule for the first network component, the rule including operational network control information for the first network component and the threshold utilization value, and apply the rule to the first network component during the reconfiguration.

In another embodiment, the infrastructure power management module is configured to power off the first network component based on the comparison.

In yet another embodiment, the infrastructure power management module is configured to monitor network operation information of a second network component included in the WLAN infrastructure, the network operation information of the second network component including a second network component utilization, and power on the first network component if the second network component utilization exceeds a second threshold value, wherein the second network component is at least one of a wireless switch and wireless access port.

Several benefits can be derived from the present invention. For example, by reducing power consumption by powering down unused or under used wireless devices, there may be an increased cost saving if auxiliary systems, such as a cooling system, can be powered down to take advantage of wireless infrastructure downtime. In addition, powering down unused wireless devices or disabling unused LANs can reduce the amount of radio frequency (RF) energy radiated in the environment. This can reduce the RF noise floor of other networks and improve the overall performance of 802.11 wireless networks due to contention to access the wireless medium being reduced.

The present invention can also be used to enforce a spectrum management discipline necessary to maintain a high performance network. In addition, the window of time when wireless intrusion attacks can be initiated against the network would be reduced by powering down access devices outside of normal business hours.

Additional features and advantages will be readily apparent from the following detailed description, the accompanying drawings and claims.

BRIEF DESCRIPTION OF DRAWINGS

Like reference symbols in the various drawings indicate like elements.

DETAILED DESCRIPTION

Figure 1:
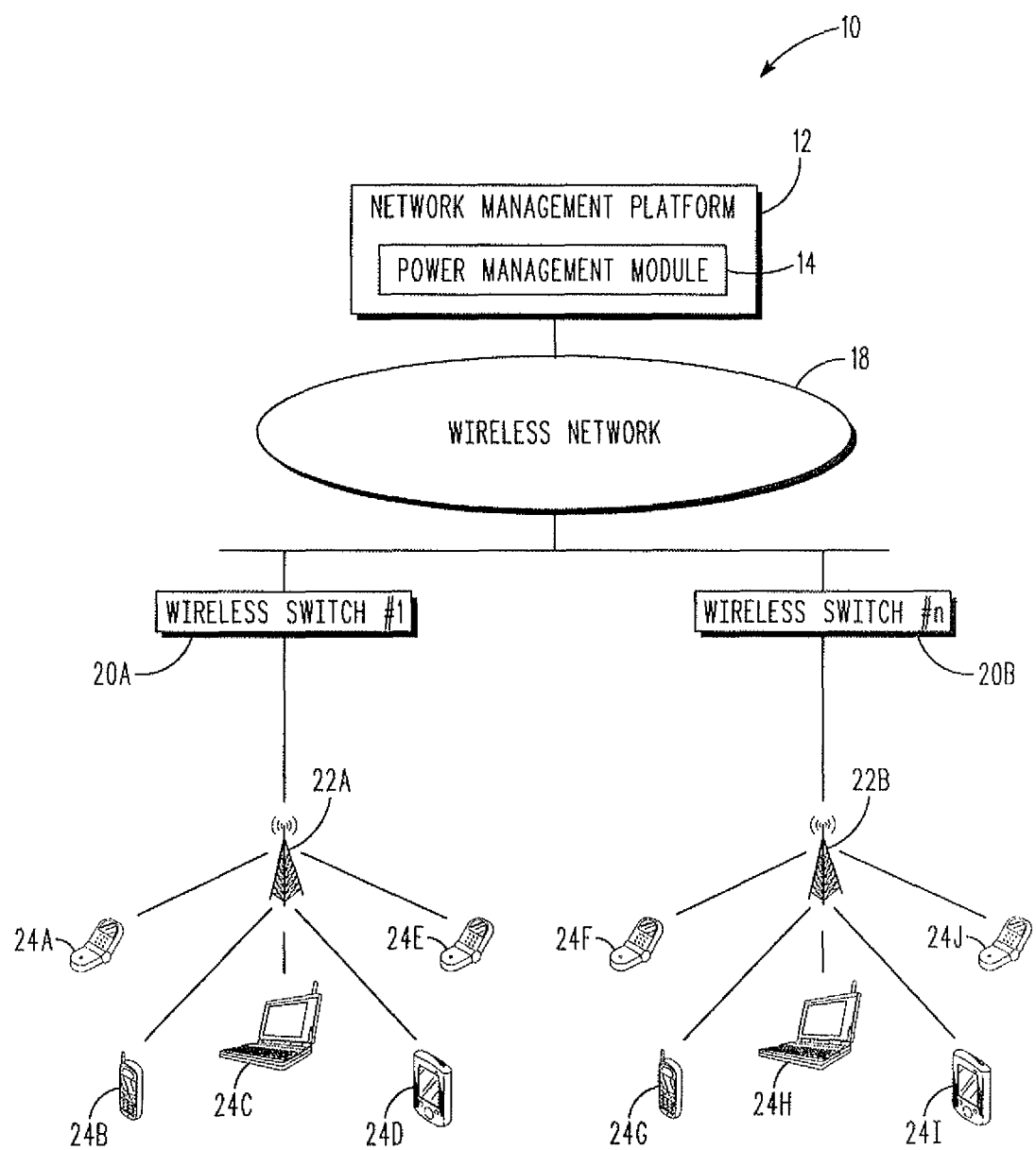
FIG. 1 is a schematic representation of a system according to an embodiment of the present invention.

FIG. 1 is a schematic representation of a system 10 in accordance with an example embodiment of the invention. In this example, the system 10 includes a network management platform 12 that is configured to manage and control infrastructure resources (wireless switches 20A-B and access ports 22A-B) of a wireless network 18. The network 18 may include or communicate with any number of additional network components, such as a traditional local area network ("LAN'). A practical embodiment can have any number of wireless switches, each supporting any number of wireless access devices, and each wireless access device supporting any number of wireless mobile units 24A-J. Indeed, the topology and configuration of the system 10 can vary to suit the needs of a particular application and FIG. 1 is not intended to limit the application or scope of the invention in any way.

As shown in FIG. 1, each wireless access device 22A-B is a wireless access port, which is a "thin" device that relies on network intelligence and management functions provided by the network management platform 12. Each wireless access port 22A-B as described herein is configured to receive data from the mobile units 22A-J over wireless links. Once data is captured by the wireless access device, the data is processed for communication within the network 18. For example, data can be encapsulated into a packet format compliant with a suitable data communication protocol. In the example embodiment, data is routed within the network 18 using conventional Ethernet 802.3 addressing (including standard Ethernet destination and source packet addresses). In alternate embodiments, data can be routed within computer network 10 using conventional Internet Protocol ("IP") techniques.

The wireless mobile units 22A-J are wireless devices that can physically move around the network 18 and communicate with network components via the wireless access ports 22A-B. Examples of mobile units include, but are not limited to, cellular phones, smart phones, personal digital assistants (PDA), and laptop computers.

The network management platform 12 provides centralized management for mobile units 22A-J and infrastructure devices 20A-B, 22A-B. For example, in one embodiment, the network management platform 12 is configured to automatically stage mobile devices, update software resident on deployed infrastructure devices and mobile devices, easily troubleshoot user problems by creating and delivering customized messages to users, and monitor and analyze mobile device statistics and network infrastructure. As such, the network management platform 12 can monitor the number of radios (e.g., access ports and switches) currently operational and number of mobile devices that are connected to the wireless network using a particular radio. In one embodiment, the management platform 12 is a rack-mounted appliance with a Web-based console for wireless network management and mobile device management. One example of the network management platform 12 is the Mobility Services Platform 3 provided by Motorola, Inc.

As shown in FIG. 1, in one embodiment, the management platform 12 includes a power management module (PMM) 14. It will be appreciated by one skilled in the art that the present invention is not limited to the PMM 14 being included in the management platform 12. For example, in one embodiment, the PMM 14 is configured to operate on one or more switches 20A-B.

The PMM 14 allows a network administrator to specify one or more rules of wireless network operation for network infrastructure components. The rules are then stored and enforced by the PMM 14. In one embodiment, rules specified by a network administrator are stored in a relational database and are accessible to the PMM 14 for enforcement. In another embodiment, specified rules are stored by the PMM 14 in a directory server, such as a Lightweight Directory Access Protocol ('LDAP') server, and are accessible to the PMM 14 for enforcement. In other embodiments, specified rules are stored in either a configured area in the memory of the network management platform 12, a configured area in the memory of one or more switches 20A-B, or both the network management platform 12 and switches 20A-B.

As used in this disclosure, the term 'enforced' refers to the ability of the PMM 14 to act upon and reconfigure network components according to rule specifications. Examples of various rules that can be specified and enforced by the PMM 14 are described in Table 1. It will be appreciated by one skilled in the art that the present invention is not limited to the rules described below and these rules are merely exemplary.

TABLE 1

| RULE FOR PMM | ACTION TAKEN BY PMM |
| --- | --- |
| 2.4 GHz is the only allowed frequency band for IT wireless operations | Power Management Module (PMM) sends configuration messages to wireless switches and access points to shutdown radios that are operating at a different GHz. If a single radio access point is operating on a different GHz band, PMM can send a message to a Power over Ethernet (PoE) switch to shutdown a particular PoE port |
| Wireless access points that have not been used for access for 15 consecutive days must be shutdown. | PMM analyzes mobile user associations over the last 15 days for every wireless device and makes a determination to shutdown the unused wireless devices. |
| Wireless access points with 1% or less utilization for 15 consecutive days must be shutdown if neighboring wireless devices are available for access. | PMM analyzes network utilization over the last 15 days for every wireless device and identifies under-utilized wireless devices. PMM also inspects neighboring APs and determines if they can modify their transmit power and data rates to fill any coverage hole of the under-utilized AP. If the coverage hole can be filled by neighboring AP's, the under utilized AP is powered down. |
| Wireless access points must be used during normal business hours only. | PMM enforces this policy by sending power down message to wireless devices outside normal business hours. |
| Wireless service set identifiers (SSID's) that have not been used for access on any access point (AP) for 15 consecutive days must be turned off. | PMM enforces this policy by examining the SSID's used for mobile user associations across all access point radios. If any SSID is unused for wireless connection in any radio over the last 15 days, SSID operation is disabled on that radio. |

Figure 2:
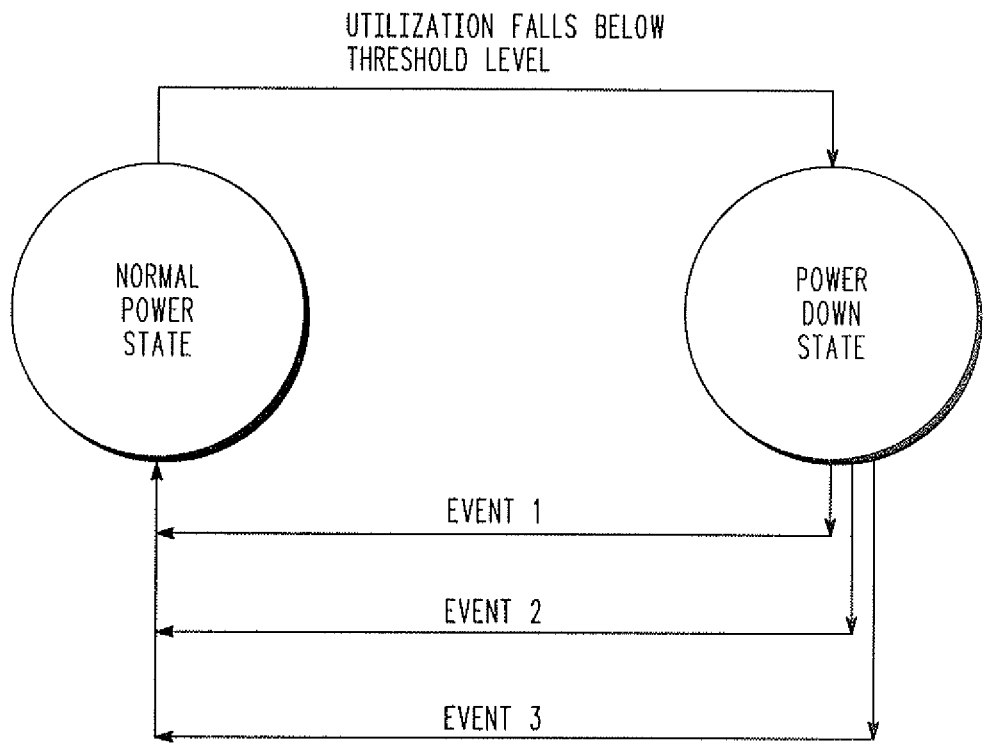
FIG. 2 is a state transition diagram showing normal and power down states for infrastructure network components according to an embodiment of the present invention.

An example state transition diagram showing normal and power down states associated with network infrastructure components is shown in connection with FIG. 2. It will be appreciated by one skilled in the art that the present invention is not limited to powering down network components to reduce power consumption. For example, in one embodiment, the PMM is configured to reconfigure infrastructure components (e.g., access ports and switches) from a low or zero power utilization back to a normal power utilization based on rules specified.

For example, in one embodiment, when an access port 22A is powered down due to low or no utilization, the PMM 12 can configure neighboring access ports 22B to process data traffic from mobile users 24A-E associated with the powered down access port. If the PMM 14 detects an increased load on the neighboring access port 22B and data traffic exceeds a predefined threshold level defined in a rule for the access port 22B, the PMM 14 can reconfigure the powered down access port 22A to operate at normal power levels.

In another embodiment, where the network 18 is configured to include a locationing system (not shown), the PMM 14 can power down network infrastructure devices 20A-B, 22A-B based on whether mobile device users are in the area covered by the locationing system. Likewise, if the locationing system reports that a mobile user is on the verge of entering its coverage area, the PMM 14 can configure appropriate network infrastructure devices to provide services to the mobile user.

In yet another embodiment, infrastructure devices are configured to periodically be powered on to listen for probe requests from mobile units. If the PMM 14 detects that the powered on device is receiving a stronger signal than a neighboring infrastructure device, the PMM 14 configures the powered on device to remain on.

Figure 3:
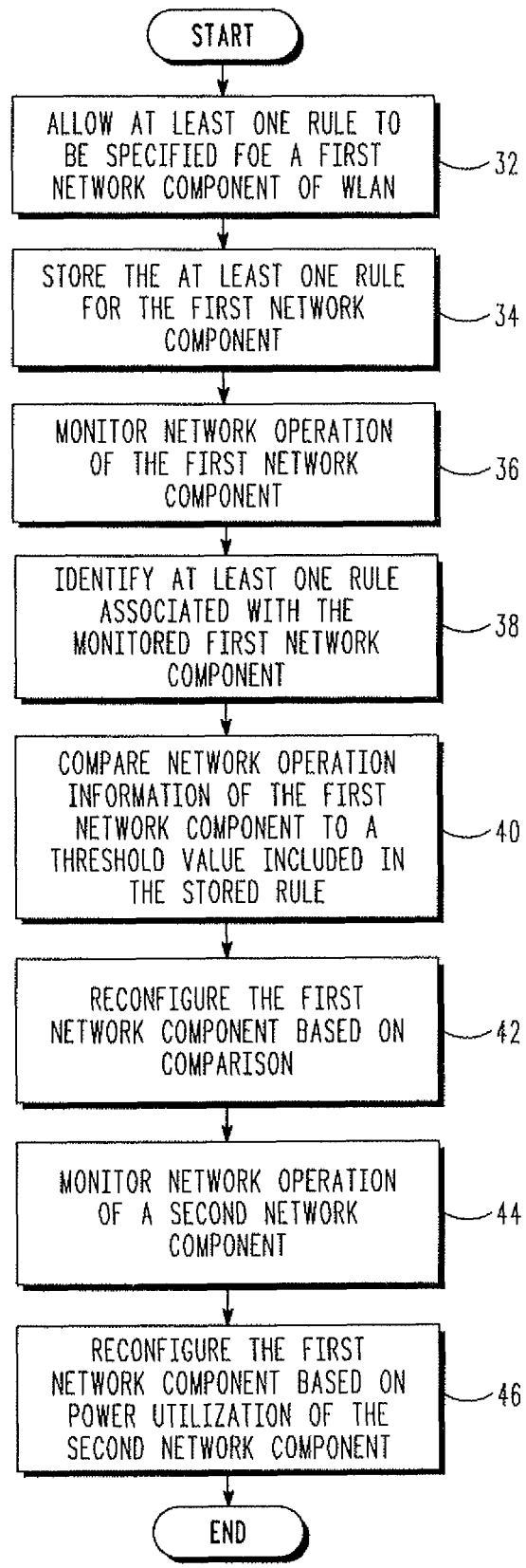
FIG. 3 illustrates an exemplary method executed by an infrastructure power management module according to an embodiment of the present invention.

Referring now to FIG. 3, an example method executed by the PMM 14 is shown. First, the PMM 14 allows a network administrator to specify one or more rules for a first network component included in the WLAN 32. Next, once the rule is specified, the PMM 14 stores the one or more network component rules 34 into a data store. Next, the PMM 14 monitors network operation of a first network component 36. The monitoring can be done continuously or periodically to identify network operation information of the component. For example, in one embodiment, the network operation information includes a power utilization of the first network component. The PMM 14 can average the power utilization over a period of time.

Next, the PMM 14 identifies at least one rule associated with the monitored first network component from the stored rules 38. The PMM 14 then compares network operation information of the first network component to a threshold value specified in the stored rule 40. For example, in one embodiment, the PMM 14 compares the power utilization of the first network component to a threshold power value defined for the first network component.

Next, the PMM 14 reconfigures the first network component based on the comparison 42. For example, in one embodiment, reconfiguring the first network component includes minimizing power utilization of the first network component. In another embodiment, reconfiguring the first network component includes operating the network component at a full power utilization level. The reconfiguring of the first network component can also include powering off the first network component. For example, in another embodiment, the first network component is powered-off based on inactivity information included in the network operation information.

In one embodiment, if the first network component is powered off, the PMM 14 powers on the first network component in response to receiving location information that a mobile device is approaching a coverage area defined for the first network component. This embodiment can include a locationing system operatively coupled to the WLAN to provide the location information. The PMM 14 can also power off the first network component based on inactivity information included in the network operation information.

The PMM 14 can monitor more than one network component. For example, in one embodiment, as shown in FIG. 3 at step 44, the PMM 14 can be implemented to monitor network operation information of a second network component included in the WLAN infrastructure. The second network component can be a wireless switch or wireless access port. The network operation information of the second network component can include a second network component utilization. The PMM 14 can then reconfigure the first network component based on power utilization of the second network component 46. For example, in one embodiment, the PMM 14 can power on the first network component if the second network component utilization exceeds a second threshold value. In yet another embodiment, the PMM 14 powers on the first network component periodically to monitor the network operation information of the second network component.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A method of managing power utilization in a wireless local area network (WLAN) infrastructure having a defined operational frequency channel, the method comprising:
    monitoring network operation information of a wireless switch included in the WLAN infrastructure, the network operation information including operational frequencies of individual radios of the wireless switch and service set identifiers used in the network;
    determining if at least one radio of the wireless switch is operable on a non-allowed frequency outside of the defined operational frequency channel in the WLAN and determining that there are unused service set identifiers on that radio; and
    reconfiguring the wireless switch to shut down the at least one radio operable on the non-allowed frequency and disabling the unused service set identifiers on that radio.

2. The method of claim 1, wherein reconfiguring the wireless switch also includes shutting down the wireless switch where that wireless switch is the only component operable on the non-allowed frequency.

3. The method of claim 1, wherein reconfiguring the wireless switch comprises powering off the wireless switch if the wireless switch has been utilized at less than a predetermined threshold for a specified period of time.

4. The method of claim 1, further comprising powering on an access point periodically to monitor signal strengths from mobile devices; and keeping the access point powered on if the access point detects a stronger signal from a mobile device than a neighboring access point.

5. The method of claim 1, wherein reconfiguring the wireless switch comprises powering off the wireless switch if the wireless switch has not been utilized for a specified period of time.

6. A system for managing power consumption of a WLAN infrastructure having a defined operational frequency channel, the system comprising:
    a wireless network;
    a wireless switch operatively coupled to the network; and
    an infrastructure power management module operatively coupled to the network, the management module configured to 1) monitor network operation information of the wireless switch included in the WLAN infrastructure, the network operation information including operational frequencies of individual radios of the wireless switch and service set identifiers used in the network, 2) determine if at least one radio of the wireless switch is operable on a non-allowed frequency outside of the defined operational frequency channel in the WLAN and determine that there are unused service set identifiers on that radio, and 3) reconfigure the wireless switch to shut down the at least one radio based on it being operable on a non-allowed frequency in the network and disable the unused service set identifiers on that radio.

7. The system of claim 6, wherein the infrastructure power management module is configured to shut down the wireless switch where that wireless switch is the only component operable on the non-allowed frequency.

8. The system of claim 6, wherein the infrastructure power management module is configured to power off the wireless switch if the wireless switch has been utilized at less than a predetermined threshold for a specified period of time.

9. The system of claim 6, wherein the infrastructure power management module is configured to power on an access point periodically to monitor signal strengths from mobile devices; and keep the access point powered on if the access point detects a stronger signal from a mobile device than a neighboring access point.

10. The system of claim 6, wherein the infrastructure power management module is configured to power off the wireless switch if the wireless switch has not been utilized for a specified period of time.

* * * * *